US008225902B2

(12) United States Patent
Kiviahde et al.

(10) Patent No.: US 8,225,902 B2
(45) Date of Patent: Jul. 24, 2012

(54) DUAL PEDAL FOOT CONTROL FOR HYDROSTATIC DRIVES

(75) Inventors: Mark M. Kiviahde, Bellemont, AZ (US); James C. Schroeder, Ramsey, MN (US); Harold D. Johnson, Zimmerman, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 121 days.

(21) Appl. No.: 12/808,767

(22) PCT Filed: Dec. 11, 2008

(86) PCT No.: PCT/US2008/086318
§ 371 (c)(1),
(2), (4) Date: Jun. 17, 2010

(87) PCT Pub. No.: WO2009/082625
PCT Pub. Date: Jul. 2, 2009

(65) Prior Publication Data
US 2011/0192252 A1    Aug. 11, 2011

Related U.S. Application Data

(60) Provisional application No. 61/016,628, filed on Dec. 26, 2007.

(51) Int. Cl.
*B60K 20/02* (2006.01)
*G05G 1/30* (2008.04)

(52) U.S. Cl. ............. 180/315; 74/512; 74/561; 180/336

(58) Field of Classification Search ............. 180/307, 180/308, 315, 336; 74/512, 560, 561, 562, 74/562.5
See application file for complete search history.

(56) References Cited

U.S. PATENT DOCUMENTS

| 243,020 | A | * | 6/1881 | Weaver ................ 74/561 |
| 372,281 | A | * | 10/1887 | Whitney ................ 74/42 |
| 1,168,218 | A | * | 1/1916 | Merritt ................ 74/483 R |
| 1,981,148 | A | * | 11/1934 | Muench ................ 74/564 |
| 4,174,852 | A |   | 11/1979 | Panzica et al. |
| 4,779,481 | A | * | 10/1988 | Natzke et al. ........... 74/512 |
| 5,207,289 | A |   | 5/1993 | Wilmo |
| 5,393,082 | A |   | 2/1995 | Fenley |
| 5,738,180 | A |   | 4/1998 | Hofmann et al. |
| 6,217,050 | B1 |  | 4/2001 | Dickie et al. |
| 6,318,786 | B1 |  | 11/2001 | Sauve et al. |
| 6,390,488 | B1 |  | 5/2002 | Wallingsford |

(Continued)

OTHER PUBLICATIONS

Graco Inc. "Line Striping Systems" brochure #33673; see pp. 9 and 15 for Graco's prior product—the LineDriver. (This invention is included on the LineDriver HD.).

*Primary Examiner* — Joseph Rocca
(74) *Attorney, Agent, or Firm* — Douglas B. Farrow

(57) ABSTRACT

In a propulsion unit having a hydrostatic drive, a pair of pedals 14 are clamped to the axle 12 in such a manner as to be comfortably positioned for the feet of the operator. The angular position of each pedal 14 relative to the axle 12 may be adjusted such that the two pedals 14 may have different angular orientations if desired. One pedal 14 may be comfortably positioned for directing forward motion of the vehicle while the other may be more comfortable for reverse motion. Set screws 16 are accessed through holes 14a in pedals 14 from above.

1 Claim, 2 Drawing Sheets

Figure 1:
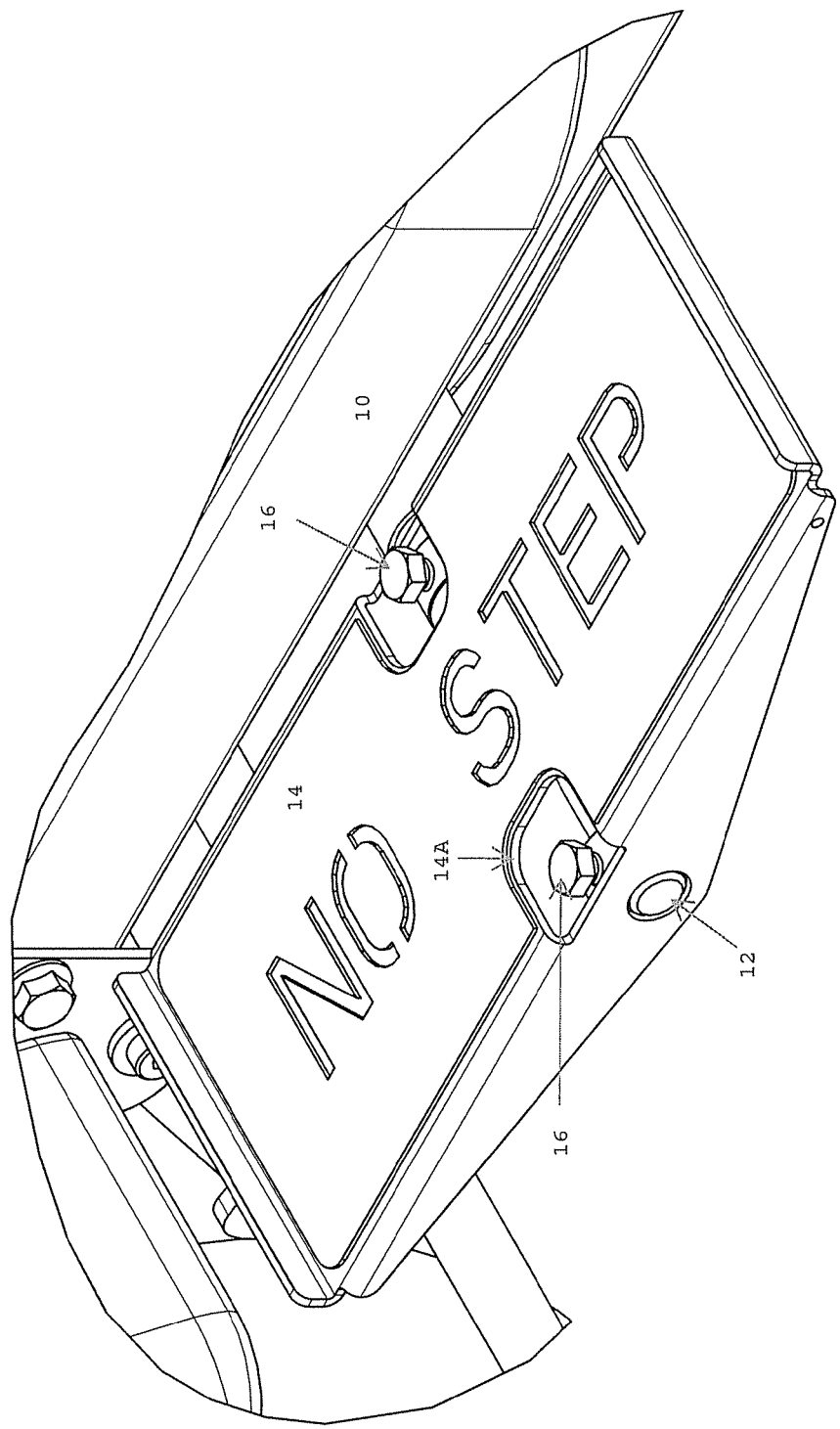

U.S. PATENT DOCUMENTS 6,634,694 B2  10/2003  Matsushita
6,883,633 B2   4/2005  Schroeder et al.
7,111,375 B2   9/2006  Buckhouse et al.
7,464,783 B2 * 12/2008  Gray et al. .................. 180/89.17
2006/0082098 A1  4/2006  Harris

* cited by examiner

DUAL PEDAL FOOT CONTROL FOR HYDROSTATIC DRIVES

RELATED APPLICATIONS

This application claims the benefit of U.S. application Ser. No. 61/016,628, filed Dec. 26, 2007, the contents of which are hereby incorporated by reference.

BACKGROUND OF THE INVENTION

Lawn tractors and similar vehicles have used hydrostatic drives for many years. Often, the drives are actuated by a rocker pedal with heel and toe action such that depressing the toe portion of the pedal produces forward motion of the vehicle and pressing the heel of the pedal produces rearward or reverse motion. An effective arrangement is shown in U.S. Pat. No. 6,883,633, the contents of which are hereby incorporated by reference.

SUMMARY OF THE INVENTION

It is an object of this invention to provide a control mechanism for such hydrostatic drives which is more flexible for the operator and which allows maximum efficiency during operation, particularly where rapid changes of direction are required such as when used on a vehicle propelling a linestriper. The propulsion unit is designed for attachment via a ball hitch to the rear of a walk-behind linestriper.

The actuating lever for the hydrostatic drive typically provides drive in one direction when the lever is rotated one way and in the other direction when lever rotation is reversed. In the instant invention, a rod is attached to the actuating lever. An axle is rotatable relative to the frame of the vehicle and is generally perpendicular to the longitudinal axis of the vehicle.

A pair of pedals are clamped to the axle in such a manner as to be comfortably positioned for the feet of the operator. The angular position of each pedal relative to the axle may be adjusted such that the two pedals may have different angular orientations if desired. One pedal may be comfortably positioned for directing forward motion of the vehicle while the other may be more comfortable for reverse motion. The clamping mechanism is designed so that the set screw or bolt used to secure the pedal faces upwardly and is accessed through a hole in the pedal it adjust rather that having to lay on the ground to access the adjustment bolt from underneath as in the prior art device.

Such an arrangement divides the fatigue normally experienced by one foot between both feet. One foot can rest while the other controls motion.

These and other objects and advantages of the invention will appear more fully from the following description made in conjunction with the accompanying drawings wherein like reference characters refer to the same or similar parts throughout the several views.

A BRIEF DESCRIPTION OF THE DRAWINGS

Figure 2:
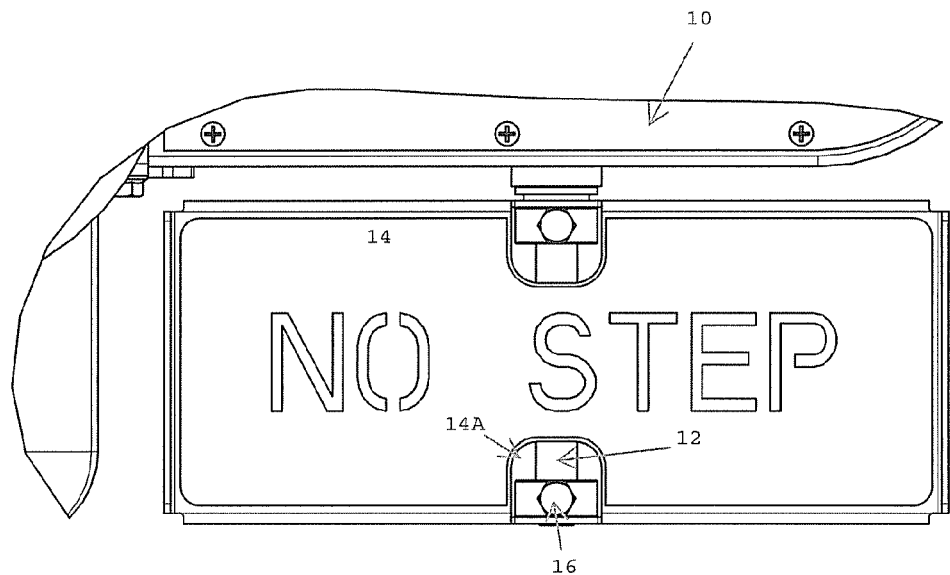
Figure 3:
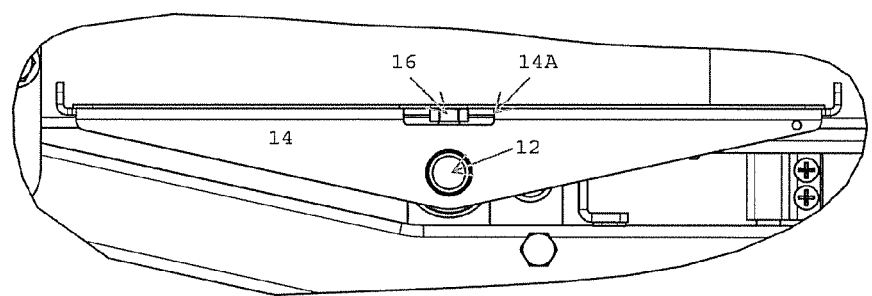

FIG. 1 shows a perspective view of the instant invention.
FIG. 2 shows an overhead view of the instant invention
FIG. 3 shows a side view of the instant invention.

DESCRIPTION OF THE PREFERRED EMBODIMENT

The instant invention is shown in FIG. 1. A frame 10 has an axle 12 rotatably mounted perpendicular to the longitudinal axis of frame 10. A pair of pedals 14 are located on either side of frame 10 and are releasably clamped to axle 12 by set screws 16. Set screws 16 are accessed through holes 14a in pedals 14 from above.

It is contemplated that various changes and modifications may be made to the foot control assembly without departing from the spirit and scope of the invention as defined by the following claims.

What is claimed is:

1. In a propulsion unit having a hydrostatic drive on a frame having a longitudinal axis, an actuating rod operating said drive and a pair of pedals independently clamped to an axle in such a manner as to be comfortably positioned for the feet of the operator, the improvement comprising:
   said pair of pedals being independently clamped to said axle via a clamping arrangement including a pair of set screws, each of said set screws located adjacent respective side surfaces of the pedal;
   each said pair of pedals further having a top surface laterally between said respective side surfaces for contact by the feet of the operator, and a plurality of apertures in each pedal, each of said apertures being located to allow access to said clamping arrangement from above;
   wherein each of said apertures are formed in a side and top surface of the pedal; and
   wherein each of said plurality of apertures allow open access to a portion of the top and side of the respective set screws.

* * * * *